April 8, 1952 N. M. ERDAHL 2,592,402
EARTH AUGER
Filed Jan. 31, 1948 13 Sheets-Sheet 1

INVENTOR.
NICHOLAS M. ERDAHL
BY
John W. Michael
ATTORNEY.

April 8, 1952  N. M. ERDAHL  2,592,402
EARTH AUGER

Filed Jan. 31, 1948  13 Sheets-Sheet 2

INVENTOR.
NICHOLAS M. ERDAHL
BY
John W. Michael
ATTORNEY.

April 8, 1952     N. M. ERDAHL     2,592,402
EARTH AUGER
Filed Jan. 31, 1948     13 Sheets-Sheet 3
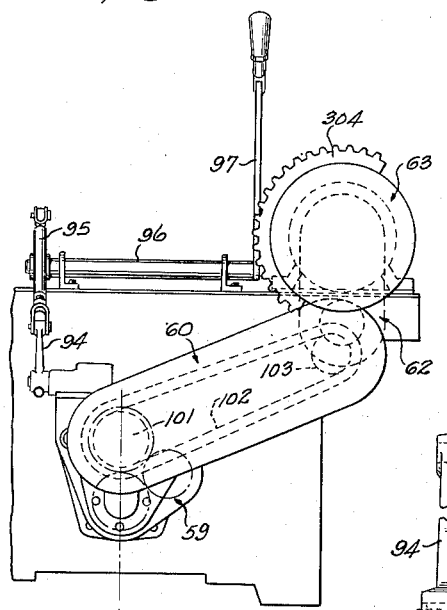
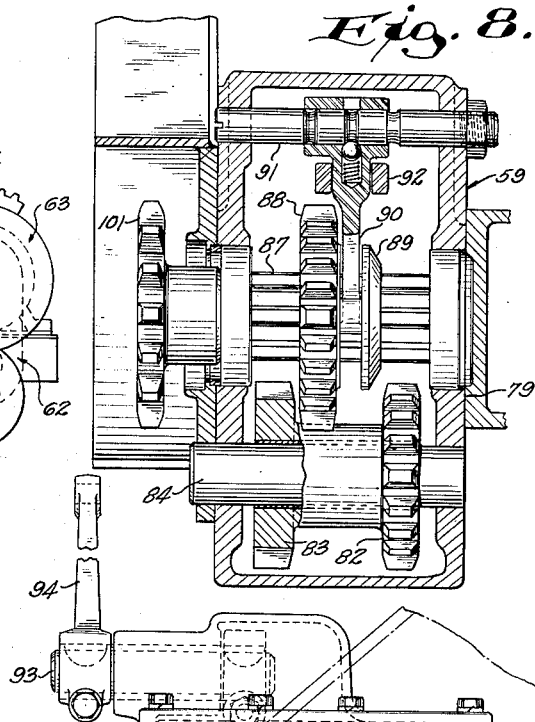
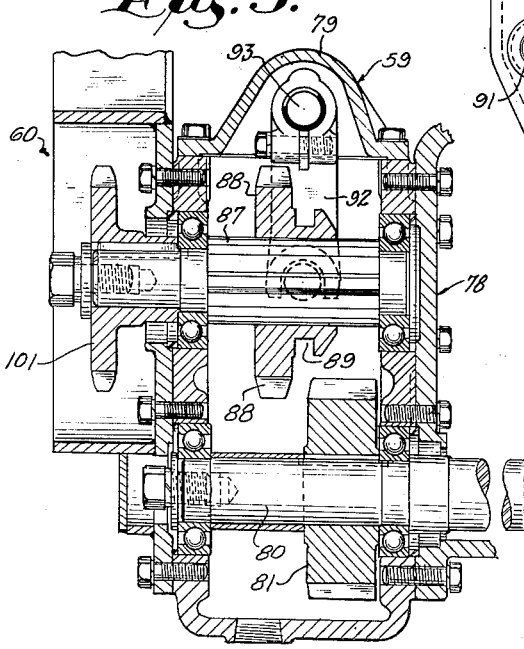
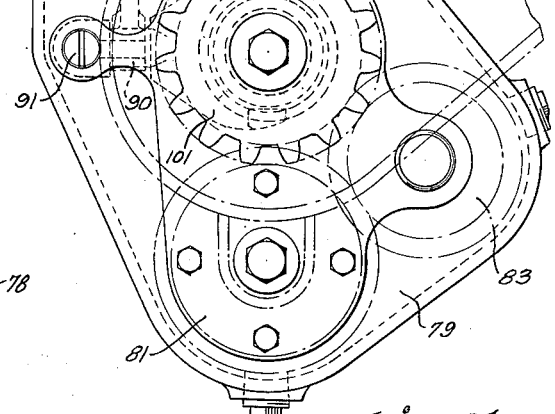
INVENTOR.
NICHOLAS M. ERDAHL
BY
*John W. Michael*
ATTORNEY.

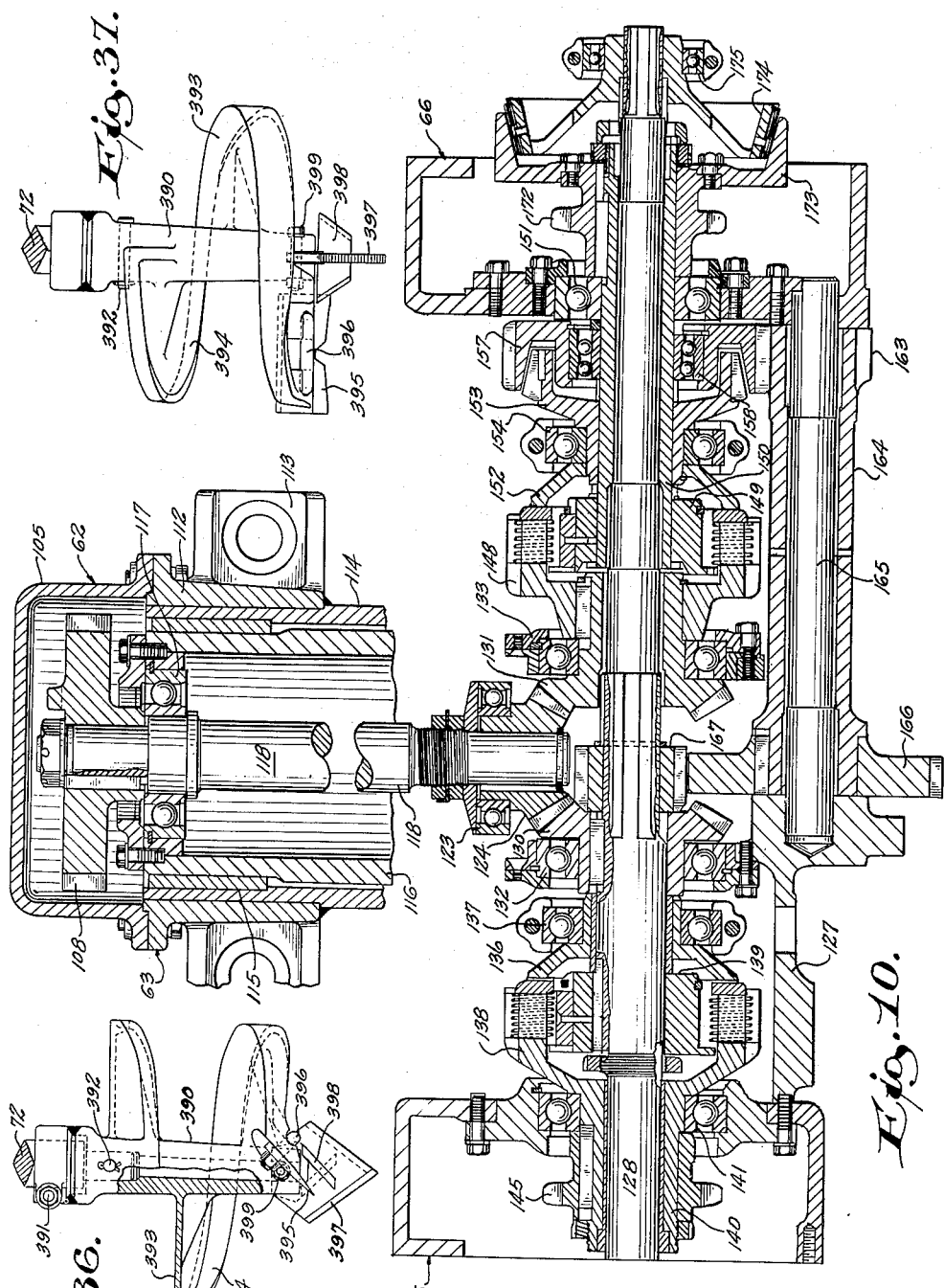

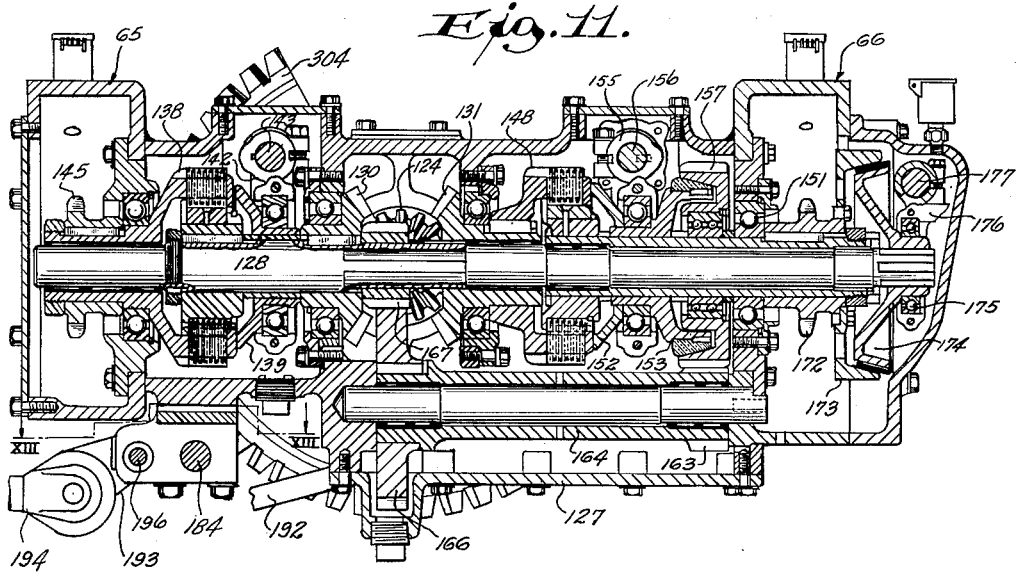
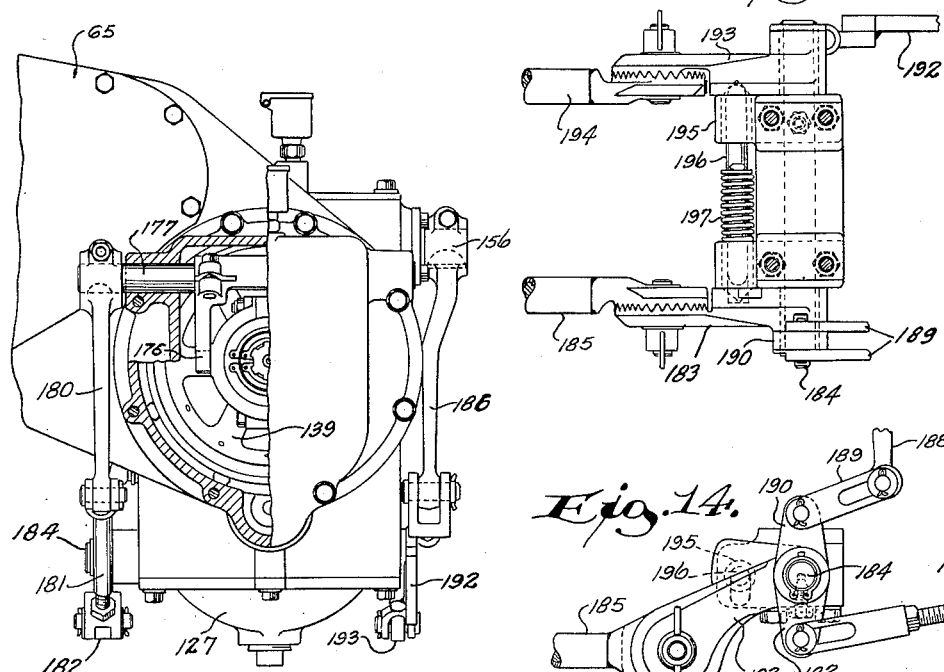
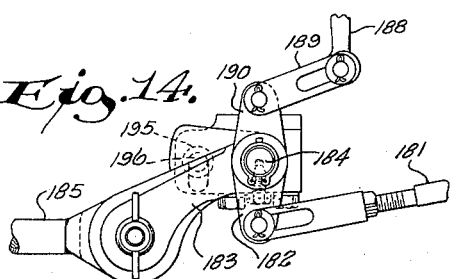

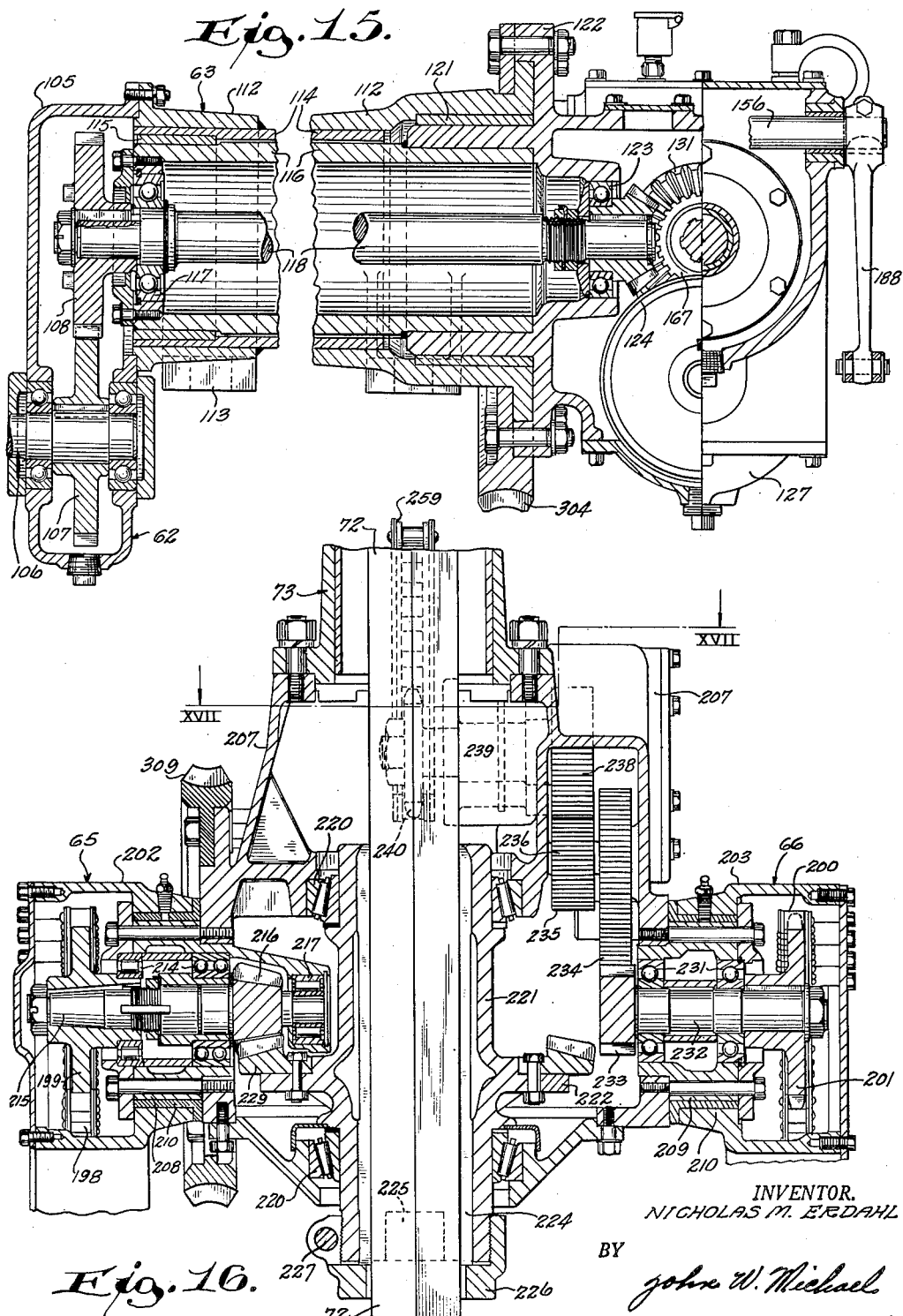

April 8, 1952 — N. M. ERDAHL — 2,592,402
EARTH AUGER
Filed Jan. 31, 1948 — 13 Sheets-Sheet 7

INVENTOR.
NICHOLAS M. ERDAHL
BY John W. Michael
ATTORNEY.

April 8, 1952  N. M. ERDAHL  2,592,402
EARTH AUGER
Filed Jan. 31, 1948  13 Sheets-Sheet 8
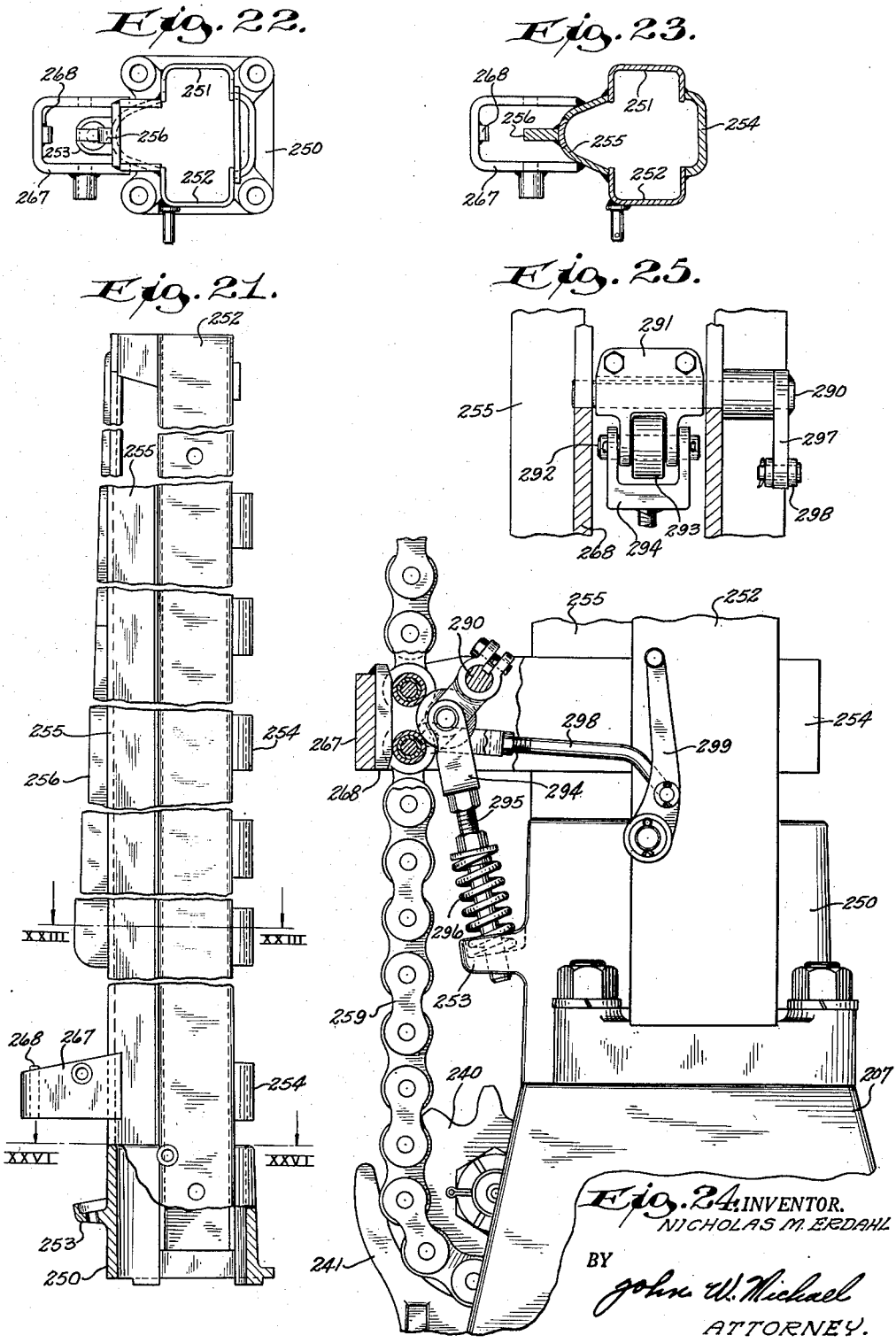
INVENTOR.
NICHOLAS M. ERDAHL
BY
John W. Michael
ATTORNEY.

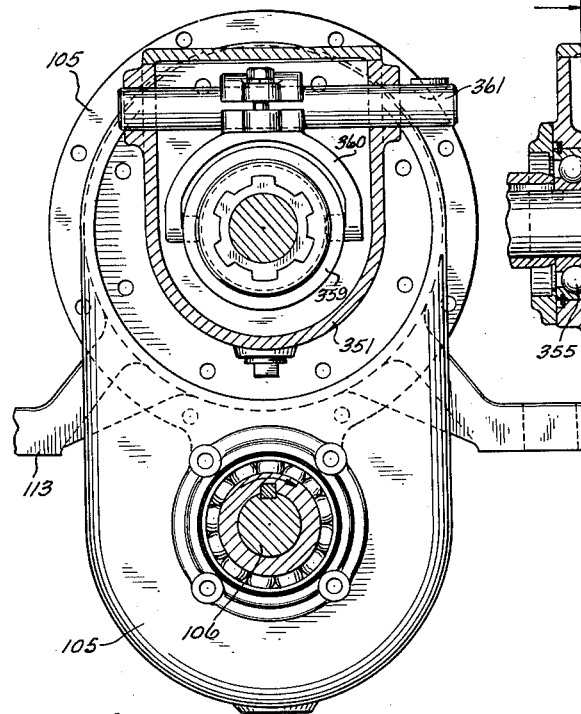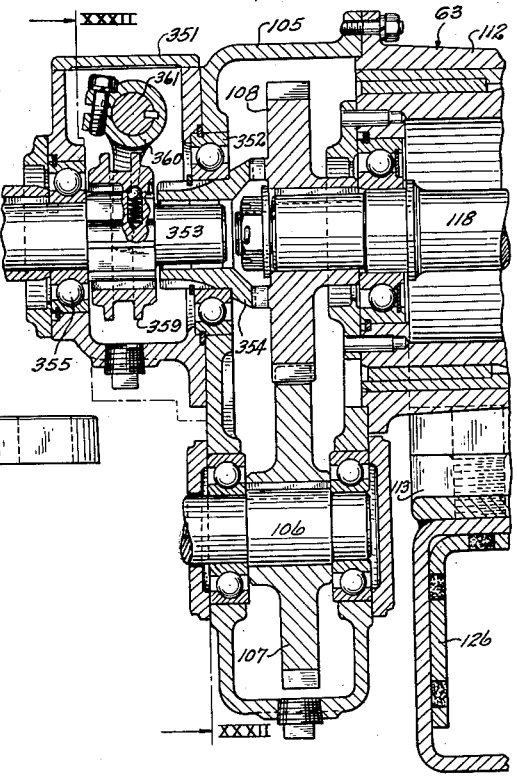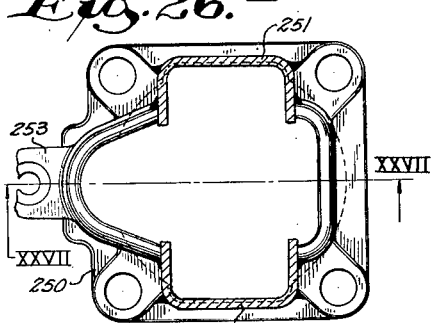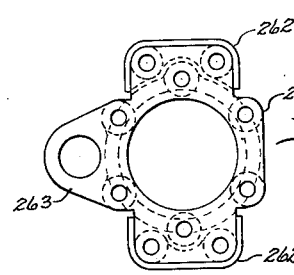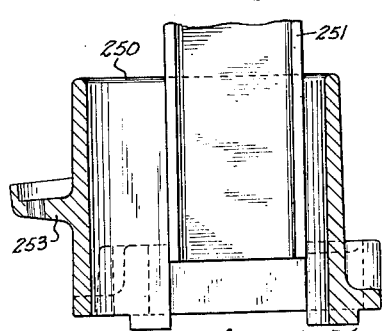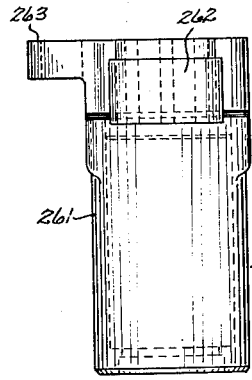

April 8, 1952  N. M. ERDAHL  2,592,402
EARTH AUGER

Filed Jan. 31, 1948  13 Sheets—Sheet 10

INVENTOR.
NICHOLAS M. ERDAHL
BY
John W. Michael
ATTORNEY.

April 8, 1952 N. M. ERDAHL 2,592,402
EARTH AUGER
Filed Jan. 31, 1948 13 Sheets-Sheet 11

INVENTOR
NICHOLAS M. ERDAHL

BY John W. Michael
ATTORNEY.

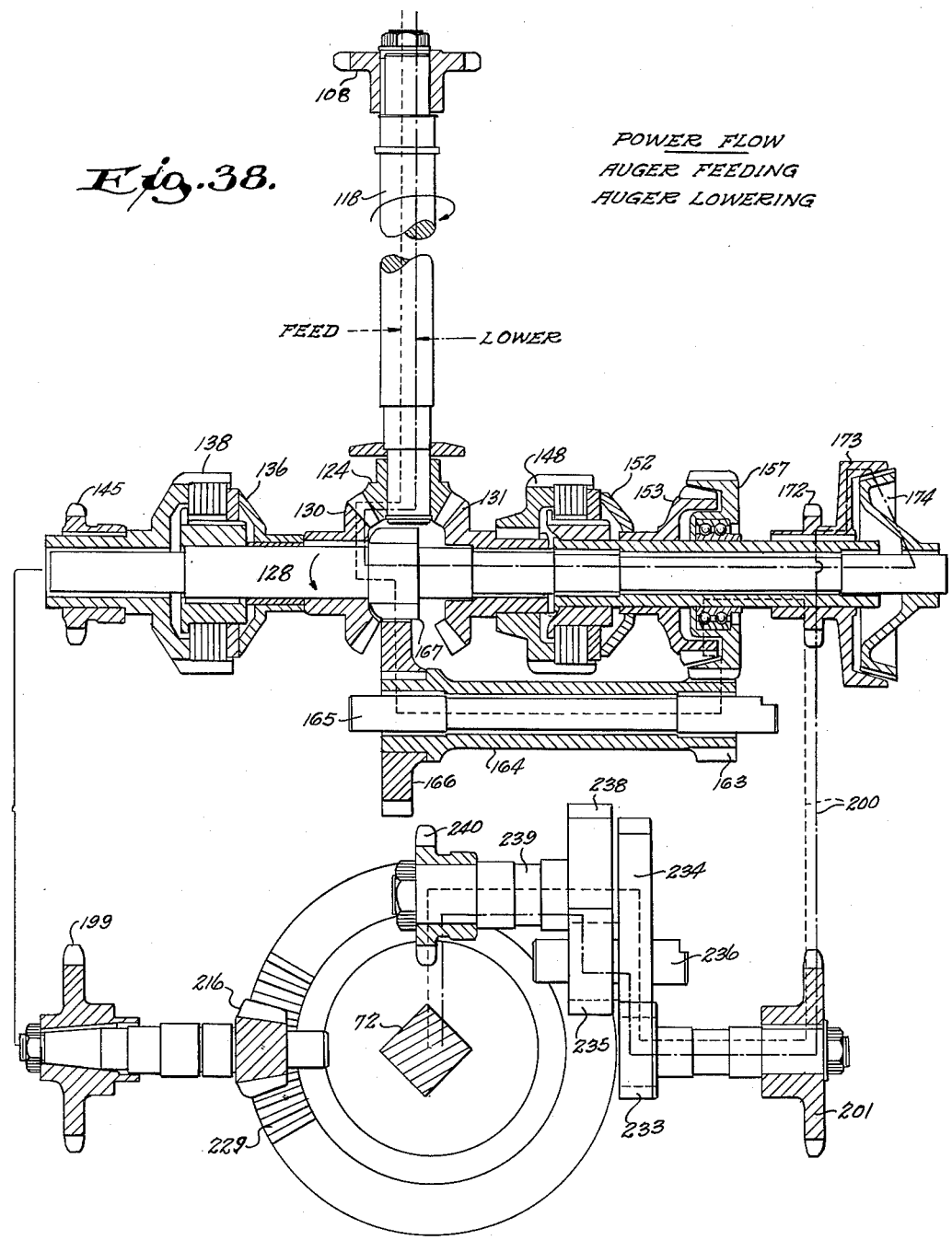

April 8, 1952  N. M. ERDAHL  2,592,402
EARTH AUGER
Filed Jan. 31, 1948  13 Sheets-Sheet 13
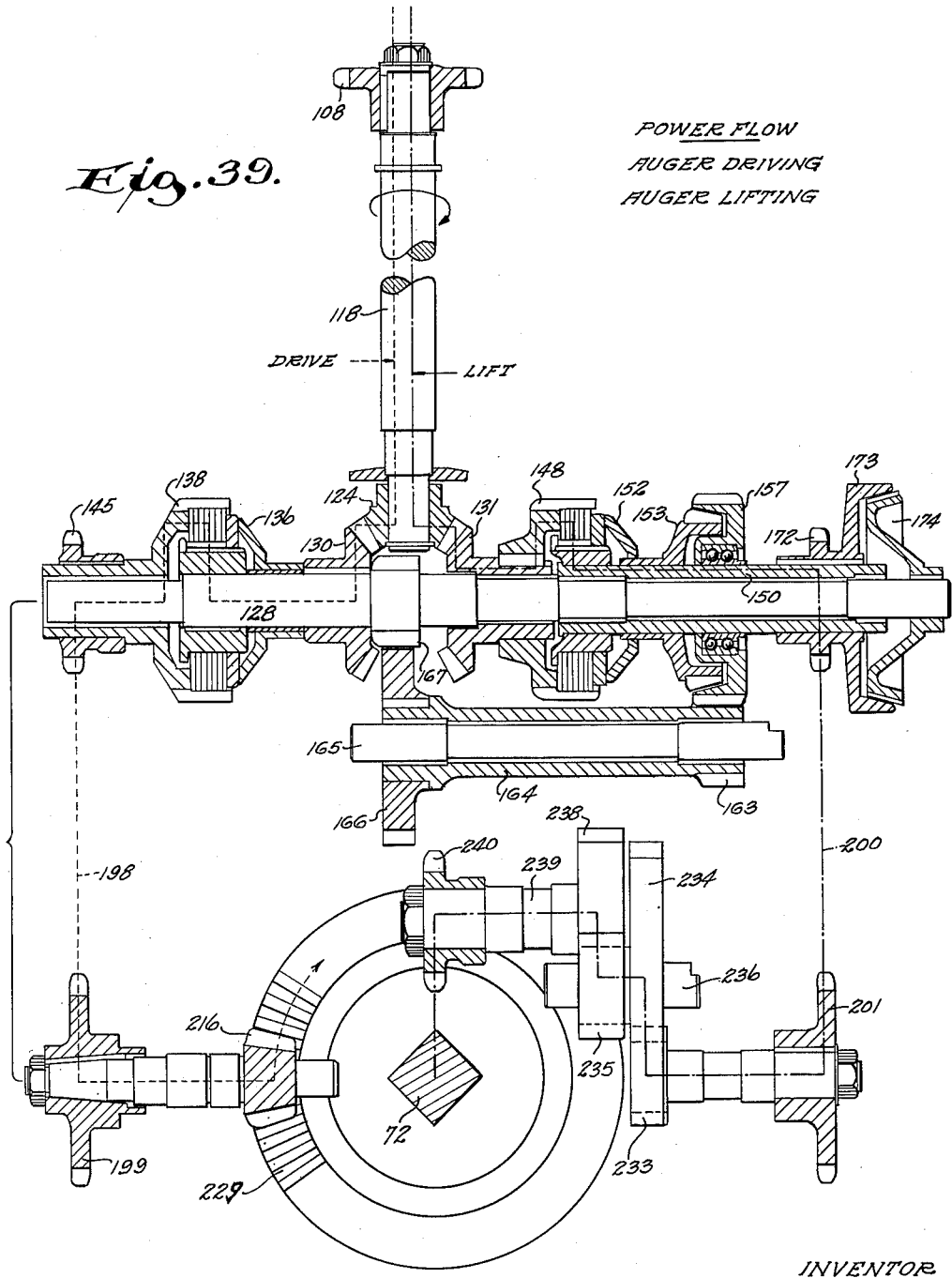

Patented Apr. 8, 1952

2,592,402

UNITED STATES PATENT OFFICE 2,592,402

EARTH AUGER

Nicholas M. Erdahl, Milwaukee, Wis., assignor to Trackson Company, Milwaukee, Wis., a corporation of Wisconsin Application January 31, 1948, Serial No. 5,581

10 Claims. (Cl. 255—22)

This invention relates to improvements in power driven augers for boring in earth and particularly to an earth auger mounted on a vehicle and either utilizing power from the vehicle drive or from a separate power source, for moving the auger both axially and rotatably as required.

In devices of this type it is essential that the auger be so mounted with respect to the vehicle that a vertical hole may be drilled while the vehicle due to uneven and sloping terrain is at an angle to the horizontal. The accomplishment of this has entailed the use of highly complex mechanical motion transmission mechanism which resulted in difficult operation, faulty control, unbalanced stresses and general loss of efficiency.

It is one object of the invention therefore to provide a power driven earth auger in which movements of the auger are controlled by particularly simple means so coordinated and interlocked as to make faulty operation of the auger virtually impossible.

Another object of the invention is to provide a power driven earth auger in which power may be applied to the auger for either independent or simultaneous axial and rotational movements thereof as desired.

A further object of the invention is to provide a vehicle mounted earth auger in which reversible power flow to the auger is controlled by the operator of the vehicle while operation of the auger itself is controlled by a separate attendant.

A still further object of the invention is to provide an earth auger in which the auger bar can be controlled and operated without unbalanced stresses being created in the operating mechanism.

And another object of the invention is to provide a power driven earth auger in which the several portions are divided into sub-assemblies for easy manufacture, assembly and maintenance, in which none of the driving mechanism and chain protecting means are exposed and in which the parts most frequently requiring replacement are readily accessible with the minimum disassembly of the structure.

Objects and advantages other than those above set forth will be apparent from the following description when read in connection with the accompanying drawing in which:

Fig. 6 is a diagrammatic view of a portion of the structure shown in Fig. 2;

Fig. 7 is an elevation, with portions of the internal structure indicated in dotted line, of a reversing gearing through which power is taken from the tractor engine for driving the earth auger;

Fig. 8 is a sectional view taken on a substantially horizontal and broken plane through Fig. 7;

Fig. 9 is a sectional view taken on a substantially vertical and broken plane through Fig. 7;

Fig. 10 is a partial sectional view on substantially a horizontal plane, of a drive intermediate the reversing gearing of Figs. 7, 8 and 9 and a final drive;

Fig. 11 is a view on substantially a vertical plane longitudinally of the shaft of the assembly shown in Fig. 10;

Fig. 12 is a view, from the right hand of Fig. 11, partially in vertical section and partially in elevation;

Fig. 13 is a partial top plane of the levers controlling the clutches in the intermediate drive of Figs. 10 and 11;

Fig. 14 is a side elevation of the structure shown in Fig. 13;

Fig. 15 is a view partially in section and partially in elevation from the left hand end of Fig. 10;

Fig. 16 is a sectional view substantially on the longitudinal axis of an auger bar and the final drive for securing rotational and axial movement thereof;

Fig. 21 is a side elevation of a modified form of mast, with portions broken out and portions in section;

Fig. 22 is a top view of Fig. 21;

Fig. 23 is a section taken on the plane of line XXIII—XXIII of Fig. 21;

Fig. 24 is an enlarged view partially in section, of a mast, with chain restraining means mounted thereon;

Fig. 25 is a section of a portion of the chain restraining means of Fig. 24;

Fig. 26 is a sectional view on the plane of line XXVI—XXVI of Fig. 21;

Fig. 27 is a section on the plane of line XXVII—XXVII of Fig. 26;

Fig. 28 is a top plan of a block guiding movement of the auger bar in the mast of Fig. 21;

Fig. 29 is a side elevation of the guide block;

Fig. 32 is a sectional view on plane XXXII—XXXII of Fig. 33, of means for taking power off the intermediate drive;

Fig. 33 is a substantially central vertical section of the structure of Fig. 32 and of a portion of the intermediate drive;

Fig. 36 is a view partially in section and partially in "side" elevation of the auger bit;

Fig. 37 is a "rear" elevation of the auger bit;

Fig. 38 is a diagram of the power flow for lowering the auger and for feeding the auger in digging;

Fig. 39 is a view similar to Fig. 38 but showing the power flow for driving the auger and for lifting the auger.

Generally, the present device employs any vehicle which has mounted thereon a power source, and, preferably, a tractor of the well-known crawler type driven by an internal combustion engine and provided with means for taking power from the engine in addition to the usual drive for automotive movement of the tractor. An auxiliary frame is mounted on the tractor to support the other portions of the earth auger structure. A reversible gearing is connected with the tractor power take-off to deliver power by way of a chain drive and a gearing transmission through a number of propeller shaft assemblies mounted on the auxiliary frame, the second of such assemblies serving as a longitudinal pivot on which the remainder of the structure may be tilted transversely to the longitudinal vertical plane through the tractor. The second propeller shaft assembly supports and is connected with an intermediate gear and clutch assembly by which power flow to the ends of the intermediate shaft, may be controlled.

The intermediate gear and clutch assembly delivers power through a pair of chain drives carried in chain drive casings spaced on opposite sides of said longitudinal pivot to a final drive mechanism which is mounted between said chain drive casings on a transverse pivot for movement longitudinally of the tractor. The final drive has mounted therein a bar for both axial and rotational drive in either direction. The longitudinal axis of the bar is close enough to the axis of the transverse pivot and the axis of the longitudinal pivot so that for the practical application of forces such longitudinal axis may be considered as intersecting such axes. This balances the forces and prevents unbalanced stresses tending to tilt the bar from the selected position during feeding and driving thereof. The axial drive for the auger bar is provided with resilient means for taking up slack and reducing stresses in the axial drive and with a latch for yieldingly holding the drive in a given position. An auger bit is mounted on one end of the bar and is provided with a readily removable and replaceable earth cutting edge and with earth breaking points. Separate means are provided for adjusting the auger to the desired position either in the longitudinal vertical plane of the tractor or transversely thereto. Such means may be manually operable or, at least one of such means, may be replaced by power driven means. A power take-off is connectible with the second propeller shaft for driving auxiliary mechanism.

The auger bar is mounted in a mast which may carry a cable handled by a winch driven from a source of power on the vehicle so that the mast may be used as a crane boom for handling poles or posts, etc.

Figure 3:
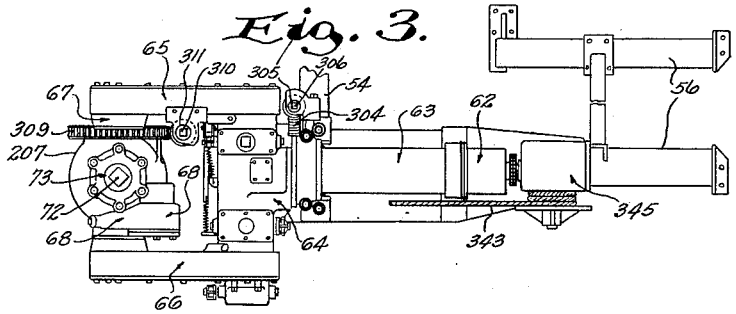
Fig. 3 is a somewhat diagrammatic top view showing the structural relations of the various portions of the earth auger structure to be applied to a tractor.
Figure 4:
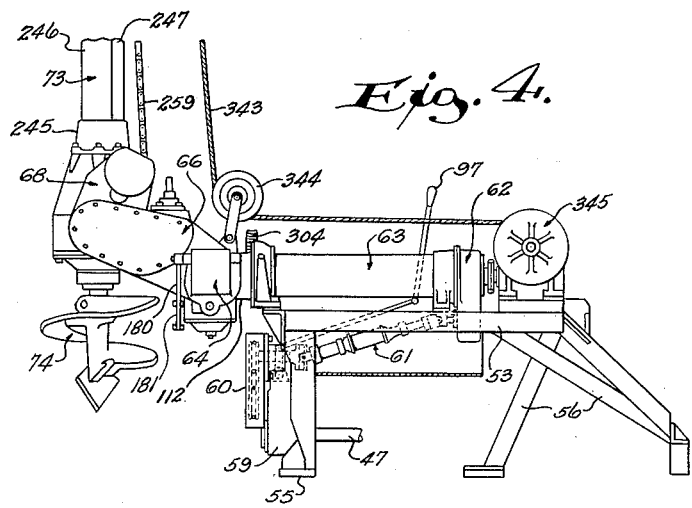
Fig. 4 is a view taken from one side of Fig. 3.
Figure 5:
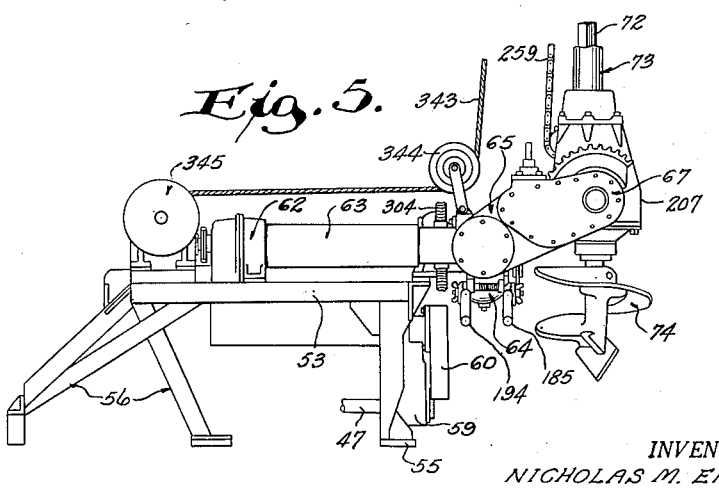
Fig. 5 is a view similar to Fig. 4, but taken from the other side of the structure of Fig. 3.

Referring particularly to the drawings, the numeral 45 generally designates a well known tractor with "crawler" treads 46 and having the usual power take-off shaft indicated at 47 in Figs. 4, 5 and 9 and extending from the rear of the tractor, and 48 designates the usual tractor frame. An auxiliary frame is adapted to be mounted on the tractor frame 48 and comprises (see Figs. 3, 4 and 5) interconnected side members 53, together with end members 55 and 56, the whole of the above frame supporting the major portion of the novel structure disclosed in the present application, to overhang from the rear of the tractor. A reversible gearing, generally indicated at 59 (Figs. 1, 2, 6, and 9) is mounted directly on the rear wall 78 of the housing for the tractor power take-off and is connected by a sprocket chain drive 60 with one end of a first propeller shaft assembly 61 (Fig. 4). A gearing transmission 62 receives power from first propeller assembly 61 and transmits the power to a second propeller assembly 63. The propeller shaft assembly 63 is connected with an intermediate drive 64 from which power flows by way of either chain drive 65 or 66 to either a final drive 67 by which the power is applied for moving a bar 72 rotatably or to a final drive 68 for axially moving the bar. The bar is enclosed in a mast 73 and carries an auger bit 74 for boring holes in earth.

The reversible gearing 59 is mounted directly on the rear wall 78 of the housing for the tractor power take-off, the gearing being enclosed within a housing 79 in which is mounted a first shaft 80 which is preferably directly connected with the power take-off shaft 47. A gear 81 is keyed on shaft 80 and is continuously in mesh with a gear 82 preferably integral with a gear 83 and spaced therefrom, the gears 82, 83 being mounted on a second shaft 84 in the casing. A third shaft 87 is mounted in the housing 79 and has one end extending therefrom. The portion of the shaft 87 within the housing is splined for slidable mounting thereon of a gear 88 with a grooved hub 89 receiving a fork 90 slidable on rod 91 when pressure is exerted on the fork by an arm 92 on a pivot 93 extending beyond the housing 79 for connection with a linkage 94, 95 and 96 operable by a lever 97 easily accessible from the tractor seat by the operator thereof. Hence, the gear 88 may engage with gear 81 or 83 to rotate the shaft 87 in either direction and hence to permit operation in either direction of rotation whenever desired, of a sprocket 101 on the end of the shaft 87 extending beyond housing 79.

The sprocket 101 is part of the chain drive 60 (see Fig. 6) and is connected by a chain, indicated at 102, with a sprocket, indicated at 103, on one end of the shaft of the first propeller assembly 61. Such chain drives are well known and the chain drive 60 is hence not shown in detail.

The shaft of sprocket 103 (see Fig. 4) is mounted in the housing for chain drive 60 and extends therefrom. Such shaft is connected by a universal joint to a propeller shaft which is adjustable. The propeller shaft is in turn connected by another universal joint with the gear transmission 62 (see Fig. 15). Such transmission (see Figs. 10 and 15) comprises a housing 105 in which is mounted shaft 106 with gear 107 fixed thereon. Such gear meshes with a gear 108 fixed on the shaft of second propeller assembly 63. The detail structure of both the first propeller assembly and of the gearing transmission is well known and need not be further described.

The second propeller assembly 63 forms a longitudinal pivot on which the intermediate drive 64, the chain drives 65, 66, the final drives 67, 68, and the auger are supported for tilting the auger transversely relative to the longitudinal vertical plane through the tractor. An outer tube 112 with pads 113 rests on the frame 53—56 and is fixed thereto. A bushing 114 is placed in the tube and, at one end, receives a bearing 115 in which an inner tube 116 is supported to receive a bearing 117 for one end of a propeller shaft 118. The other end of the outer tube 112 has mounted directly therein a bearing 121 to receive a flanged member 122 which is fixed to the end of the inner tube 116 and which supports a bearing 123 for the other end of the propeller shaft 118. It will thus be seen that the inner tube 116, shaft 118 and member 122 may be rotated relative to the outer tube 112 which forms a rigid support for such moving parts and the parts mounted thereon.

Figure 1:
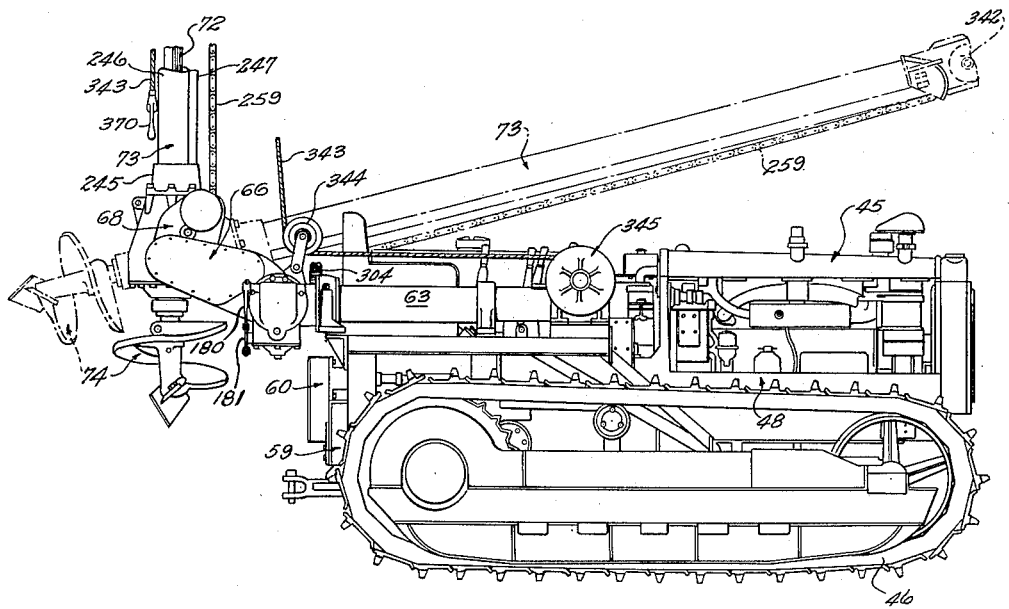
Fig. 1 is a side elevation of a crawler type tractor with the earth auger of the present invention mounted thereon and in position for transportation thereby.

It will be seen by reference to Fig. 32 that housing 105 is so mounted on the outer tube 112 that the housing may be swung about the center of propeller shaft 118 in either direction whenever the bolts are removed. As the angular spacing of the bolt holes is 45° the adjustment may be made in increments of 45°. Such arrangement greatly facilitates mounting of the structure either by the use of the pads 113 directly or by use of a frame 126 when the earth auger is to be mounted on a yielding platform, such as a truck floor. Reference to Figs. 1 and 4 makes it clear that when the auger unit is mounted on the tractor with the power take-off at the rear the power is supplied to shaft 106 of gearing transmission 62 from the left as viewed in Fig. 4 and from the right as viewed in Figs. 15 and 33. However when the unit is mounted on a truck which has the power take-off at the front the power is supplied to shaft 106 from the right as viewed in Fig. 4 and from the left as viewed in Figs. 15 and 33. This is accomplished by merely alternating the pads on the shaft holes of the housing 62 and inserting the shaft from the opposite side. The alternative truck position is illustrated in Figs. 15, 32, and 33. When used on a yielding platform the power is supplied to shaft 106 from the end opposite (see Fig. 33) to that in which it is supplied with the tractor (see Fig. 15).

The propeller shaft 118 has mounted thereon a bevel gear 124 to deliver power to the intermediate drive 64 particularly shown in Figs. 10, 11, 12 and 15. A housing 127 supports shaft 128 which has bevel gears 130 and 131 meshing with propeller gear 124, the gears 130, 131 being mounted in suitable bearings 132, 133 in housing 127 and providing support for the central portion of the shaft 128. The bevel gear 130 is keyed to shaft 128 so that the latter rotates whenever shaft 118 rotates. A plate clutch portion 136 is mounted about shaft 128 in a bearing 137 to coact with clutch portion 138 of a first plate clutch having the plates thereof bearing on a ring 139 on the shaft. The clutch part 138 has an extended hub portion 140 supported in a bearing 141 mounted in the housing with a sprocket 145 fixed thereon to form a part of the chain drive 65. Thus when clutch portion 138 is engaged, it will rotate with the shaft 128 and cause the chain drive 65 to operate. The plate clutch portion 136 is slidably mounted on shaft 128 for engagement with the clutch portion 138 by a fork 142 (see Fig. 11) mounted on a pivot 143 and adapted to be actuated by a leverage externally of the casing 127, as will appear hereinafter.

The gear 131 rotates on the intermediate assembly shaft 128 and has an extended hub on which is fixedly mounted one portion 148 of a second plate clutch of which the plates bear on a ring 149 on a quill 150 (see Fig. 10) rotatably mounted on the shaft 128 and supported in a bearing 151 mounted in the housing for chain drive 66. Thus when clutch portion 148 is engaged the quill 150 will rotate at about the same speed as shaft 128 but in the opposite direction. The other portion 152 of the second plate clutch is slidable on the quill 150 and is combined with one portion 153 of a first cone clutch, both the clutch portions 152 and 153 being supported by a bearing 154 and movable by a fork 155 on a pivot 156 upon movement thereof by a leverage externally of the casing 128, as will appear hereinafter. The other half 157 of the first cone clutch is supported on a bearing 158 on the quill 150 and is peripherally toothed for meshing with a gear 163 on one end of a quill 164 supported on a fixed counter bar 165. The quill 164 has a gear 166 mounted on the other end thereof to mesh with a gear 167 splined on that portion of shaft 128 between the bevel gears 130, 131. The half 157 is thus continually driven at a slower R. P. M. than the shaft 128 and in the same direction. Hence when clutch portion 148 is disengaged and clutch half 157 engaged, the quill 150 will be driven at a reduced R. P. M.

All of the intermediate drive clutches are of the type which automatically disengage unless positively held in engagement by the auger attendant. Such clutch structure is essential for safe and easy operation of the machine and greatly contributes to the speed with which the machine produces its end result.

Quill 150 has fixed adjacent one end thereof a sprocket 172 (forming portion of the chain drive 66) to which is connected one portion 173 of a second cone clutch, the other portion 174 of such cone clutch being mounted in a bearing 175 and splined on the end of shaft 128 for sliding thereon by means of a fork 176 on a pivot 177 which is to be actuated by a leverage externally of the housing 117, as will appear hereinafter.

The clutch pivot 177 bears a crank 180 (see Fig. 12) connected by an adjustable rod 181 with the lower arm 182 (see Figs. 13 and 14) of a double armed bell crank 183 mounted on a pivot 184 in a portion of the intermediate drive housing 127, the bell crank having an operating arm adjustably connected with a lever 185 extending toward one side of the tractor and beyond the rear end thereof. Clutch pivot 143 also bears a crank 188 connected by link 189 with the upper arm 190 of the bell crank 183. Clutch pivot 156 bears a crank 186 connected by a link 192 with one arm of a bell crank 193 mounted on the other end of pivot 84 and having its other arm adjustably connected with a lever 194 extending adjacent lever 185. It will thus be seen that the various clutches of the intermediate drive are controllable only from a location at which the auger is under the direct observation of an attendant other than the tractor operator. The pair of clutches 136, 138 and 173, 174 are thus operable by lever 185 while the piar of clutches 148, 152, and 153, 157 are operable by lever 194 so that the clutches of each pair can be operated only simultaneously and in opposite directions. When lever 185 is pressed down, clutch 136, 138 is engaged to rotate the auger and when such lever is lifted, clutch 173, 174 is engaged to lower the auger toward the ground. When lever 194 is pressed down, clutch 153, 157 is engaged to feed the auger into the ground and when such lever is lifted, clutch 148, 152 is engaged to lift the auger out of the bored hole. Hence, the attendant need not shift his grasp on the levers during boring operation of the auger. Lever 194 cannot cause clutch 153, 157 to be engaged at the same time as clutch 148, 152. Levers 185, 194 are so interlocked that it is impossible to engage clutch 148, 152 for lifting the auger simultaneously with engagement of clutch 173, 174 for lowering the auger. Barrels 195 are formed adjacent the pivot 184 to receive a pin 196 which is urged toward the lever 194 by spring 197 under compression. One end of the pin 196 engages in a socket in one arm of bell crank 193 when lever 194 is in neutral position, while the other end of the pin engages in a slot in the operating arm of bell crank 183 when movement of lever 194 out of the neutral position forces the pin to move toward the bell crank 183 against pressure of the spring 197. Such slot is so shaped that lever 185 may be pressed down to engage the auger driving clutch 136, 138 at any time but such lever cannot be raised up to engage the lowering clutch 173, 174 unless the lever 194 is in neutral position. It is, therefore, impossible for the auger attendant to engage the lifting clutch 148, 152 and the lowering clutch 173, 174 at the same time, and hence it is impossible to apply opposing forces. Hence, it is virtually impossible for the attendant to make an error in the operation of such clutches.

The sprocket 145 is connected by a chain 198 (see Fig. 16), with a sprocket 199 forming a portion of the chain drive 65 and the sprocket 172 is connected by a chain 200 with a sprocket 201 forming a portion of the chain drive 66. The casings 202 and 203 for the respective chains form a support for the housing 207 enclosing the final drives 67 and 68. The final drives housing 207 is supported between the chain drive casings 202 and 203 on hub-like portions 208 and 209 extending through bearings 210 into the chain drive housings so that the final drives may pivot between such casings. The hub 208 is provided with bearings 214 receiving shaft 215 on which the sprocket 199 is fixed at one end to receive the chain 198. The other end of shaft 215 has fixed thereon a bevel gear 216 for the purpose of rotating the bar 72 as will be described, and such shaft end is supported in a bearing 217 in the hub 208. One advantage of this construction is that the auger bar is supported between opposite casings which increases stability and strength and still permits a splitting of the driving and rotating power flow.

Figure 18:
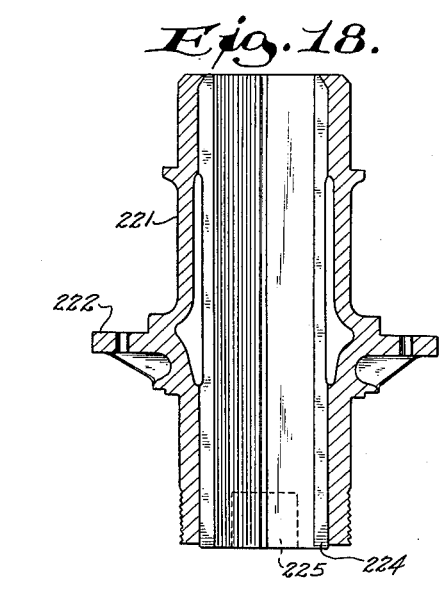
Fig. 18 is a longitudinal section of the auger bar engaging means.
Figure 19:
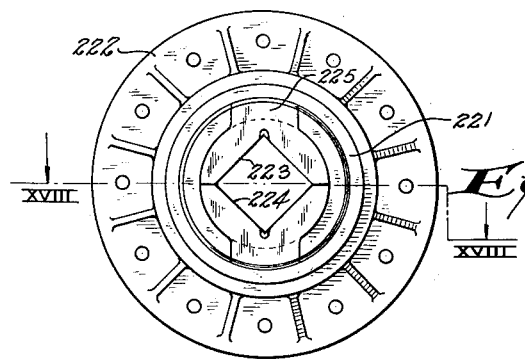
Fig. 19 is a bottom plan view of the auger bar engaging means of Fig. 18.

The final drive housing 207 carries bearings 220 in which is rotatably mounted a substantially cylindrical sleeve 221 with a flange 222 (see Figs. 18 and 19). A pair of blocks or fillers, 223, 224 is fixed in the sleeve to provide a square interior passage to guide a squared portion of the bar 72 in its axial movement therethrough. The fillers are severally provided with tabs 225 engaging in notches in an end of the sleeve, and are held against movement relative to the sleeve by a nut 226 locked by clamp bolt 227. The sleeve flange 222 has mounted thereon a ring gear 229 meshing with the gear 216. Hence, driving the sprocket 199 and gear 216 rotates ring gear 229 and bar 72 and such rotation may be in either direction dependent on the manner in which the gears are meshed in the reversing gearing 59. The sleeve forms the sole steadying support for the lower end of the bar 72 which is also supported at its upper end, but has no support intermediate the two ends.

Because of the fact that the driving blocks 223, 224 are subjected to sliding therethrough of exposed and dirty portion of the bar 72 and to pressure dependent on the direction in which the bar is being rotated, and are therefore the elements most frequently requiring replacement, such blocks and the retaining means therefor are specially designed for easy and quick removal and replacement. When the blocks are worn, it is necessary merely to remove the clamp bolt 227 and to back off nut 226 whereupon the blocks drop out of sleeve 221 and new blocks may be inserted. None of the other auger driving mechanism need be disturbed in making the above change.

Figure 17:
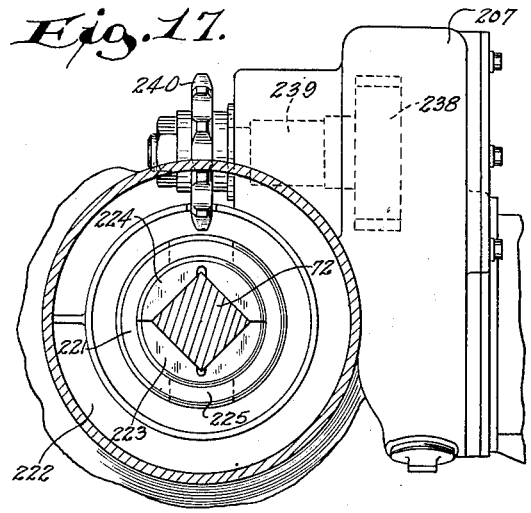
Fig. 17 is a sectional view, omitting the chain, on the plane XVII—XVII of Fig. 16.

The hub 209 is provided with a plurality of bearings 231 supporting a shaft 232 having the sprocket 201 mounted on one end thereof and having a gear 233 fixed on the other end thereof. The gear 233 drives a speed reducing gear train housed in the final drive casing 207 and comprising gears 234 and 235 on the same shaft and a gear 238 mounted on one end of a shaft 239 having a sprocket 240 (see also Fig. 17) mounted on the other end thereof. The speed reducing gearing and sprocket 240 form a part of the means for securing axial movement of the bar 72, the remaining portions of the axial bar drive being associated with and partially inclosed in a mast mounted on the final drive casing 207 and substantially enclosing the bar 72.

Figure 20:
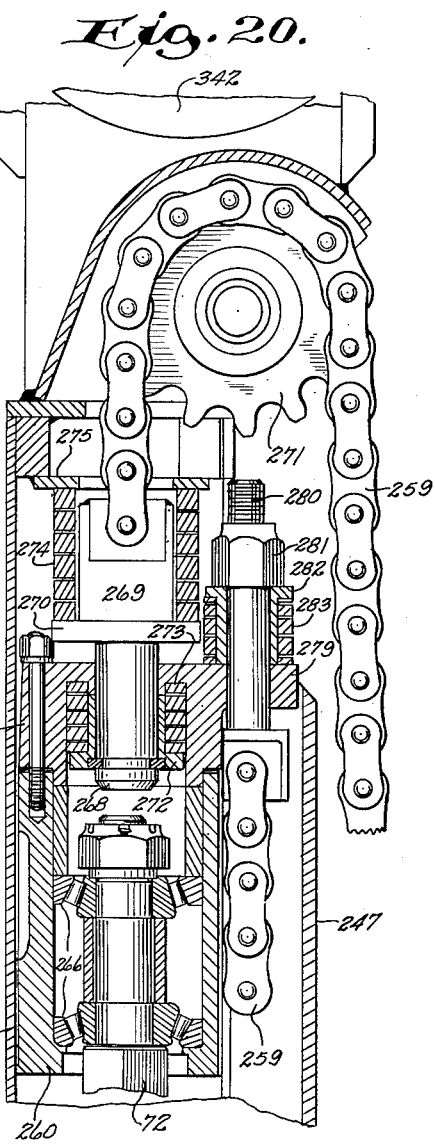
Fig. 20 is a fragmentary vertical sectional view, on substantially a longitudinal plane, of a mast with means connecting the head portion of the auger bar and a chain for axially moving the bar.

The mast may comprise a tubular socket 245 in which is mounted a tube 246 with a semi-cylindrical chain channel 247 as indicated in Figs. 1, 4 and 20. But the mast preferably comprises a substantially square socket 250, as shown in Figs. 26 and 27, in which are fixed two integral U-shaped side channels 251 and 252 in opposed relation with a seat 253 extending from one side of the socket for a purpose to be described. The side panels are interconnected on one side by relatively shallow U-shaped strips 254 and on the other side by relatively deep arched strips 255 with a continuous bar 256 mounted edgewise on the top of the arched straps to provide a guide for a chain 259 for moving the auger axially. A guard 241 extends from the mast adjacent sprocket 240 to keep chain 259 engaged with the sprocket even if the chain should become slack for any reason.

When a tubular mast is used, a substantially cylindrical member 260 (see Fig. 20) is used as a guide block for the upper end of the auger bar 72 but when a square mast is used, a guide block 263 (see Figs. 28, 29) is used for the upper end of the auger bar. The guide blocks also serve for attachment of the chain 259 to the auger bar 72. The block 263 is substantially rectangular in transverse section and is provided with replaceable bearings 262 seating in the mast side channels 251, 252 for sliding movement therein.

Regardless of the type of mast and guide block used, the means for attaching the ends of the chain 259 to either of such blocks is substantially the same. A plurality of bearings 266 (see Fig. 20) are mounted in the guide block to receive the end of the auger bar 72 for rotation thereof relative to the block. A cap 267 is fixed on one end of the guide block 260 and has a flanged aperture therethrough to receive a stem 268 extending from a connector block 269 with a peripheral flange 270. The block 269 is connected with one end of chain 259 which passes over a sprocket 271 on the mast and over the drive sprocket 240. The connector stem 268 has a flanged sleeve 272 mounted thereon for retaining a compression spring 273 between the end wall of the cap and the sleeve flange. A second compression spring 274 is seated between the connector block flange 270 and an apertured stop 275 fixed in the mast immediately below the sprocket 271 to absorb the shock when the bar 72 reaches fully raised position. (It will be understood that cap 267 is omitted when guide blocks 263 are used and that the stem and spring connection of block 269 are then within the guide block 263.)

The cap 267 has a lateral projection 279 with an aperture through which is passed a bolt 280 for attaching the other end of the chain 259, the nut 281 of the bolt seating on a flanged sleeve 282 and retaining a third compression spring 283 between the cap projection 279 and the flange of sleeve 282. While sleeves 272 and 282 are shown abutting the cap 267 and projection 279 respectively, when the device is in operation, only one sleeve will be in such position at a time. When the chain is forced in one direction by the sprocket 240 slack will normally occur in the chain between the sprocket and the non-working end of the chain. As this occurs the respective one of springs 273 and 283 will expand to keep tension on the chain. The chain 259 is accordingly connected at both ends with the bar 72 by tension take-up means automatically operable in either direction. Cap projection 279 is engaged in chain guide 247 to prevent rotation of guide block 260 in mast tube 246, which would interfere with free movement of chain 259. It will be noted that all of the springs interconnecting bar 72 and chain 259 are located far from the auger so that the present device is not subject to the criticism that the impact and stress reducing springs become dirt packed and fail to perform their function. Further, it will be readily seen that the present machine is improperly assembled unless all of the springs are in place for performing their function.

It is desirable to provide resiliently yielding means for holding the auger bar against downward movement when in the vertical position and when no power is applied thereto. The chain 259 accordingly passes through a bracket loop 267 (see Figs. 24 and 25) extending from the mast and providing a multiple socketed member 268 in which two adjacent portions of the chain may seat. A pin 290 extends across the bracket 267 to receive a yoke 291 in which is mounted a pin 292 for rotatably receiving a roller 293 and the ends of a second yoke 294. A rod 295 extends from the yoke 294 through a hole in the seat 253 on the mast and adjustably supports the end of a spring 296 seating at the other end in the seat 253, the spring urging the roller into engagement with and pressing the chain portions into the socketed member 268. A crank 297 is fixed on the pivot 290 and is connected by a link 298 with a lever 299 pivoted on the side of the mast. Movement of the lever 299 clockwise swings the roller 293 out of engagement with and allows free movement of the chain when desired, but reverse movement of the lever again engages the roller with the chain and resiliently latches the chain in position.

The entire intermediate and final drive structure above described may be pivoted on the outer tube 112 of the assembly 63 to swing the mast 73 transversely of the tractor. Pivoting of the final drives 67 and 68 in the chain casings 202 and 203 allows the mast 73 to be swung longitudinally of the tractor to any position between the substantially horizontal position shown in broken lines in Fig. 1 and a position well to the left of the vertical as viewed in Fig. 1. During such swing the mast 73 is adequately supported on both sides of its longitudinal axis, thus equalizing stresses and aiding smooth operation.

Such swinging can be obtained by manually operable means or by power driven means. Manually operable means for both longitudinal and transverse swinging of the bar are shown in Figs. 3, 4 and 5. The required transverse swing is within relatively narrow limits and can be done quickly and with little effort. Hence, such swing is preferably obtained by manually operable means and includes a worm wheel segment 304 mounted on the intermediate drive casing 127 for engagement with a worm 305 rotatably mounted in a casing 306 fixed on assembly 63. If desired, manually operable means may also be used for the longitudinal swinging of the bar. This comprises a worm wheel segment 309 fixed on the final drive casing 207 and engageable by a worm 310 rotatable in a casing 311 mounted on the casing of chain drive 65. One end of each worm extends beyond its casing and is squared to receive a suitable hand crank (not shown).

Figure 30:
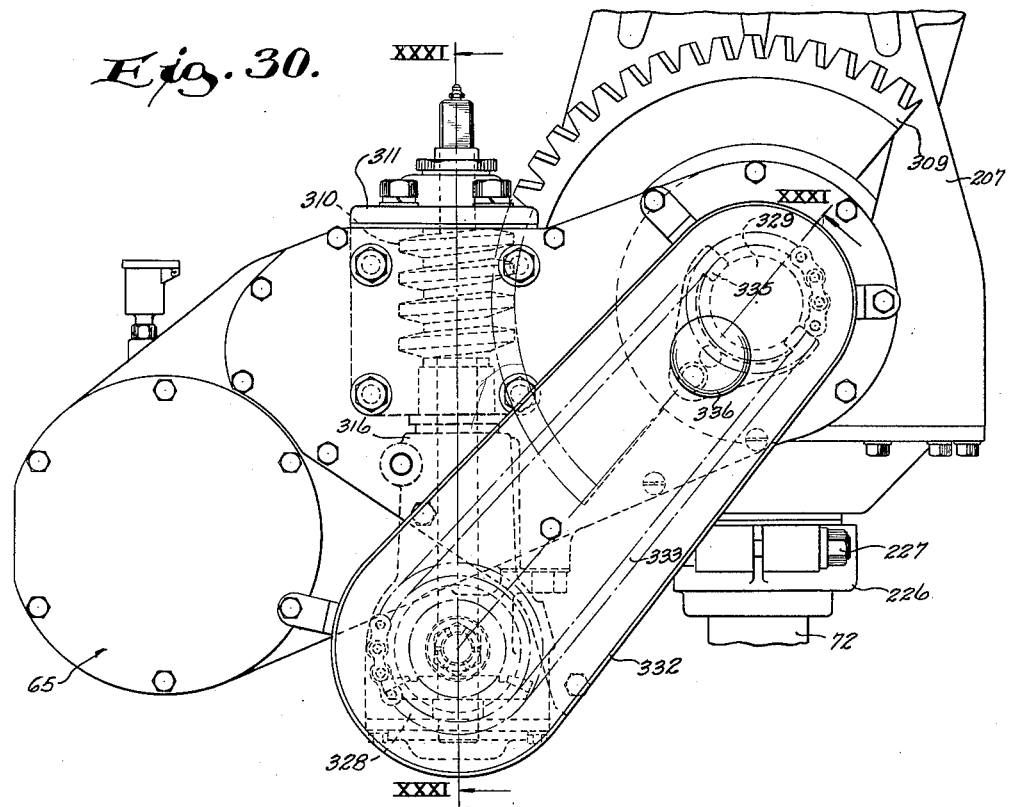
Fig. 30 is a side elevation, with some internal parts indicated in dotted lines, of power driven means for swinging the mast longitudinally of the tractor.
Figure 31:
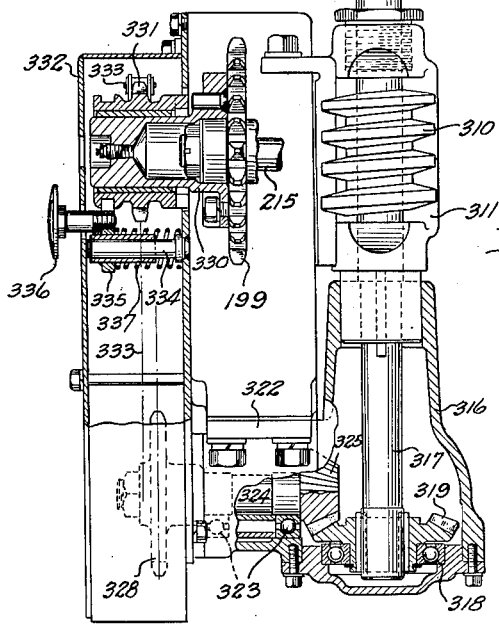
Fig. 31 is a view partly in end elevation and partly sectional on the broken plane XXXI—XXXI of Fig. 30.

However, swinging of the mast 73 longitudinally from the horizontal position to vertical position by manual means requires considerable effort and time and such manual means may be advantageously replaced by power driven means such as shown in Figs. 30 and 31. Such power drive involves connection of the worm 310 with the chain drive 65 by suitable clutch means under the control of the auger attendant. A housing 316 is connected with the worm housing 311 for rotatably supporting a shaft 317 in bearing 318 and having a bevel gear 319 thereon. The housing 316 has a lateral portion 322 with bearings 323 for rotatably supporting a shaft 324 at a right angle to shaft 317. The shaft 317 has a bevel gear 325 engaging gear 319 and a sprocket 328. An extension shaft 330 is mounted in the casing of chain drive 65 to the hub of sprocket 199 and is rotated whenever the bar 72 is rotated. A sprocket 331 is formed with elongated hub portions and is rotatably mounted on extension shaft 330. The extension shaft 330 and the sprocket 331 are formed with jaws providing a jaw clutch engageable when sprocket 331 is moved toward sprocket 199. Sprockets 328 and 331 are interconnected by a chain indicated at 333 for driving the worm 310 when the jaw clutch is engaged at the will of the auger attendant. A bar 334 mounted in casing 332 slidably supports a sleeve 335 with a fork engageable with a groove in the hub of sprocket 331. A push button 336 extends outside of casing 332 from the sleeve. The sleeve is urged in one direction by a spring 337 tending to keep the jaw clutch disengaged unless the action of the spring is overcome by the attendant pressing on the button. Power is taken from sprocket 199 by engaging the clutch. This also shifts sprocket 331 into alignment with sprocket 328 and delivers power to the gearing 325, 319 and to the worm 310. Such power is supplied only so long as the jaw clutch is held in engagement and the auger bar 72 is rotating. The spring 337 disengages the jaws of clutch immediately upon release of the button.

Figure 2:
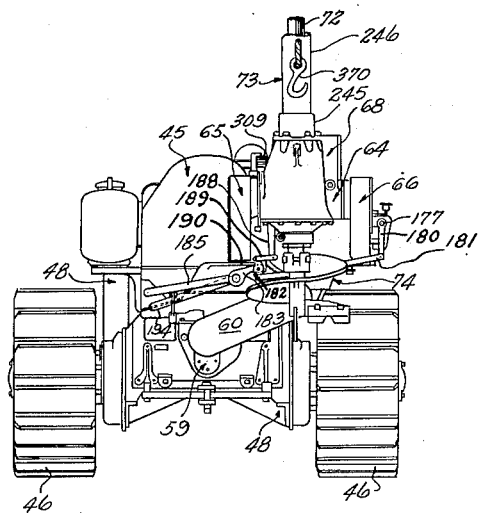
Fig. 2 is a rear view of the device with a fragment of the earth auger in the raised or operating position.

The operation of the device will now be explained by reference to diagrammatic Figs. 38 and 39, with the assumptions that the auger and the drives are in the position shown in Fig. 2, that the vehicle power take-off clutch is engaged so that power may be taken from the engine and that reversible gearing 59 is so engaged as to give the rotation indicated by the arrow about shaft 18, in Figs. 38 and 39 (which rotation will be called the "forward" direction). The auger and the bar are first rapidly lowered into contact with ground then rotated and positively slowly fed or forced into the ground. Upon completion of the boring operation, the auger is lifted out of the bored hole. During the lifting it may be rotated if so desired. If need arises the auger may be rotated in the reverse direction to clear it from any obstruction.

Referring particularly to Fig. 38, fast lowering of the auger requires flow of power as indicated in dot-dash line and requires engagement of the cone clutch 173, 174. Power is then transmitted through gears 124, 130, shaft 128, clutch 173, 174, sprocket 172 and chain 200 to sprocket 201 which drives gear train 233—238 and sprocket 240. Sprocket 240 rotates in the direction to cause counterclockwise movement of the mast chain 259 which lowers the auger relatively rapidly to the surface of the ground. Feeding of the auger into the ground then requires movement of the bar and auger in the lowering direction but at a relatively slow rate. Hence, clutch 173, 174 is now disengaged and cone clutch 153, 157 is engaged to secure power flow (see dotted line) through gears 124, 130, shaft 128 and gear 167, gear 166, quill 164, gear 163 and clutch 153, 157 to sprocket 172 which drives the chain 200, and hence slowly rotates the sprocket 240 as above described. It will be seen that a considerable speed reduction now occurs which provides a rate of downward movement for feeding the auger which is less than that obtained from the auger lowering drive.

Referring now to Fig. 39, the flow of power for driving or rotating the auger is shown in dotted line and for lifting the auger is shown in dot-dash line. For driving the auger the clutch 136, 138 is engaged and power flows through gears 124, 130, intermediate drive shaft 128, clutch 136, 138 to sprocket 145 and through the chain 198 to sprocket 199, gear 216 and ring gear 229 which is fixed to the sleeve 221 clasping the bar 72 for rotational movement. Lifting the auger after it has been driven to the desired depth requires engagement of plate clutch 148, 152. Power then flows through gears 124, 131, plate clutch 148, 152 and quill 150 to sprocket 172 which now operates in the direction reverse from that described above for lowering and for feeding the auger into the ground. The sprocket drive chain 200 and sprocket 201 supply power to drive the speed reducing gearing 233—238 and sprocket 240 which now drives the mast chain 259 in the clockwise direction to lift the bar and the auger. During this time the auger may be rotated if desired. If at any time it is necessary to reverse the direction of auger rotation, the clutches in the intermediate drives are set in neutral and the tractor operator reverses the reverse gearing 59 by lever 97. Then when clutch 136, 138 is engaged by pushing down lever 185 the auger will be rotated in the direction opposite to that indicated in Fig. 39.

Figure 35:
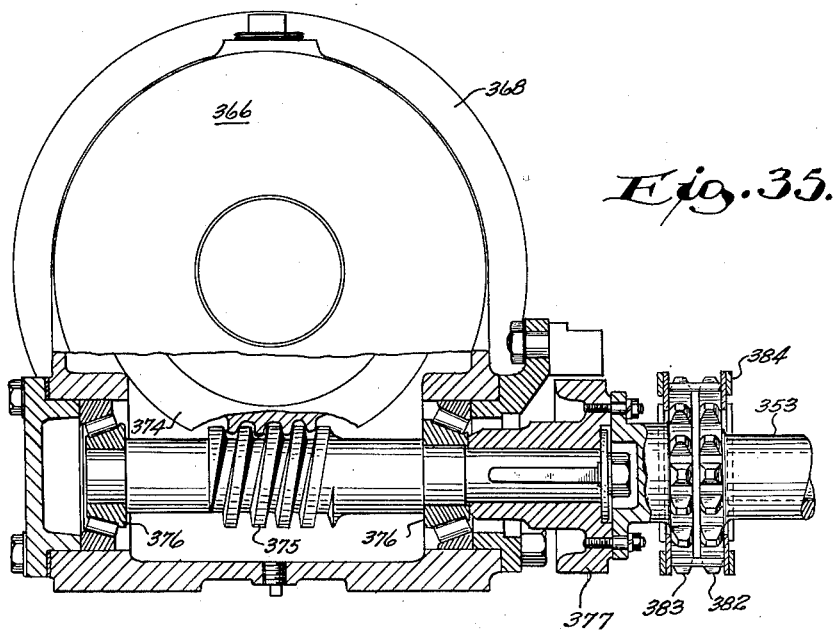
Fig. 35 is a view partially in section and partially in elevation of the structure shown in Fig. 34.

The mast may carry a sheave 342 (see Fig. 1) over which is run a cable 343 also running under a pulley 344 movably mounted at the foot of the mast, and thence to a winch generally designated 345 driven by power from the propeller shaft 118. The mast may accordingly, upon suitable positioning thereof, be used as a boom so that poles, for example, may be set into the holes bored by the earth auger. The power take-off (Figs. 32 and 33) includes a housing 351 fixed on the gear housing 105 with a bearing 352 in an opening through the two housings in alinement with the propeller shaft 118 to receive a shaft 353 keyed to a sleeve 354 thereabout, the sleeve having splines forming one portion of a clutch and being provided with jaws engaging similar jaws on the propeller shaft driving gear 108. The shaft 353 extends beyond housing 351 through a bearing 355 for receiving a portion of a flexible coupling 384 (see Fig. 35) by which power may be supplied to the winch 345 or to any other auxiliary mechanism to be used in connection with the earth auger. A portion of the shaft 353, between the bearings 352 and 355, is splined and has mounted thereon a clutch 359 slidable into engagement with the splines of sleeve 354 upon movement of a fork 360 fixed on a pivot 361 and operable by a lever (not shown) accessible to the vehicle operator.

Figure 34:
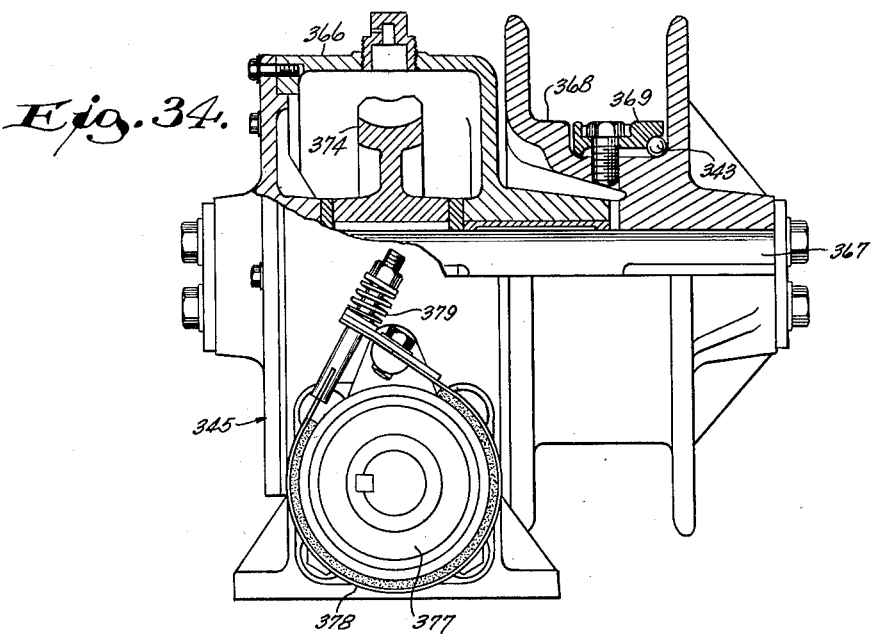
Fig. 34 is a view partially in section and partially in elevation of a winch applicable to the present device.

The winch 345 (see Figs. 34 and 35) may comprise housing 366 enclosing and supporting a shaft 367 on which is mounted a drum 368 with an anchor 369 for fastening one end of the cable 343, the other end of the cable being provided with a hook 370. The shaft 367 has mounted thereon, within the housing 366, a worm wheel 374 meshing with a worm 375 in bearings 376 and extending from the housing. The extended end of the worm shaft is provided with a brake drum 377 toward which a brake band 378 is urged by a spring 379 unless the spring action is counter-acted as is well known. The power take-off shaft 353 and worm shaft are connected by a flexible coupling, which may be complementary sprockets 382, 383, respectively, fixed on the above shafts and joined by a chain 384 thus providing a coupling allowing considerable misalinement of the two shafts. Operation of the brake drum is under control of the vehicle operator.

The auger itself has particularly effective earth loosening points and cutting edge, both of which are removable. The auger includes a stem 390 formed with a socket in one end to receive the squared end of bar 72 and split for clamping to the bar by a bolt 391 to prevent relative rotation of the auger and the bar, relative axial movement of the auger and the bar being prevented by a pin 392 through both the stem and the bar. A helix 393 is preferably formed integral with the stem and has one or more ribs 394 on one side thereof to prevent distortion of the helix under heavy loads of earth. A cutting edge member 395, which is removable and reversible, is fastened on the helix by a U-bolt 396 partially imbedded in the undersurface of the helix and having nuts bearing on the upper surface of the cutting edge. The end of the stem 390 is slotted to receive an edged and substantially diamond shaped point 397 extending axially of the auger and formed with wings 398 extending laterally from the point and along the point at an angle greater than that of the helix. The cutting point is held in place by a bolt 399. It will thus be seen that the present auger parts cannot be so jammed as to make either the cutting edge, the point or the auger as a whole difficult to remove from the bar 72.

It will be seen therefore that the present invention provides a structure in which supply of power to the auger and control of the direction of action of such power on the auger and to the winch are possible from the vehicle operating position but in which all other controls for the auger must be actuated from a position in which auger movement may be directly observed by a separate attendant. The latter controls are so interconnected that the auger movements cannot be erroneously carried out.

The propeller shaft assembly provides a pivot for movement, in one plane, of the remainder of the construction which is overhung from the vehicle, the overhung parts being also mounted for pivoting in another plane. The intermediate drive and clutch assembly permits the supply of power for independently or simultaneously securing axial and rotational movement of the auger as desired. A number of final drives are supported on the intermediate drive and clutch assembly to apply power to the auger bar for rotating the same and through a speed reducer for axial movement of the bar. Such final drive also provides power for pivoting the bar and auger longitudinally of the tractor. Axial movement of the auger is positive in both directions. The mast for housing the auger may act as a crane boom for a cable activated by power from the engine on the vehicle. The cutting points and edge for the auger helix are so mounted thereon that such edge and points may be removed and replaced without difficulty at any time. It will be seen that only sprockets 240, 271 and a portion of chain 259 are exposed while all other power transmitting elements are enclosed in relatively tight housings. Maintenance of the machine is thus greatly facilitated and the life of the machine is considerably extended as compared to similar devices now in use. The power transmitting mechanism is made up of a number of separately constructed sub-assemblies which are so designed as to be readily combined without the use of shims or assembly fitting operations, if the various sub-assemblies are manufactured to the usual machining tolerances.

Although but one embodiment of the present invention has been illustrated and described, it will be apparent to those skilled in the art that various changes and modifications may be made therein without departing from the spirit of the invention or from the scope of the appended claims.

I claim:

1. In an earth auger, a vehicle having a source of power thereon, an auger mounted on the vehicle for axial movement by the power source, a chain drive transmitting power from the source to the auger for axial movement thereof in either direction, a spring yieldingly connecting one end of the chain with the top of the auger, and a second spring yieldingly connecting the other end of the chain with said top of the auger, said springs acting alternately to maintain tension on the chain in either direction of axial movement of the auger.

2. In a power driven earth auger, a mast, an auger supported by the mast, means including a chain for transmitting power from a source of power to the auger for axial movement thereof, and a latch mounted on the mast for retaining the auger and chain in predetermined position comprising a bracket for backing up the chain and a spring-biased lever for engaging the chain and urging it against said bracket, and manual means for swinging said lever out of operation when it is desired to apply power to the chain for movement of the auger.

3. In an earth auger adapted for mounting on a vehicle having a source of power, an outer bearing member fixedly mounted on the vehicle, an inner member rotatable in said outer member about a longitudinal pivot, a propeller shaft in said inner member to receive power from said power source, a housing fixedly mounted on said inner member, said housing having a pair of casings extending forwardly of and on opposite sides of said inner member, an intermediate drive shaft in said housing receiving power from said propeller shaft, the ends of said intermediate drive shaft extending into said casings, a final drive housing mounted and supported by and between said casings for rotation about a transverse pivot, an auger carried by the final drive housing for axial and rotational movement, and final drive means in said final drive housing receiving power from said intermediate drive shaft through said casings.

4. In an earth auger, a tubular member rotatably mounted on a base for turning about a longitudinal pivot, a drive shaft mounted in said member coaxially with said pivot, a housing for an intermediate drive secured to an end of said tubular member and extending laterally from opposite sides of said tubular member, a casing on each end of said housing, said casings extending forwardly of said tubular member, an intermediate drive shaft rotatably mounted in said housing and connected with said drive shaft, a driving member coaxially mounted with respect to said intermediate shaft at each end thereof, each of said driving members being positioned within one of said casings, a final drive housing mounted between and supported by said casings for rotation about a pivot transversely of said longitudinal pivot, an auger bar carried in said final drive housing and movable axially and rotationally with respect thereto, ring and pinion gear means mounted within said final drive housing and driven by one of said driving members and associated with said bar to provide rotating force thereto, means for axially moving said auger bar including a shaft partly in said final drive housing and one of said casings, a driving connection between said last mentioned shaft and the other of said driving members, first clutch means mounted in said housing and operable to engage said one of said driving members with said shaft, and second clutch means mounted in said housing and operable to engage said other of said driving members with said shaft.

5. In an earth auger as defined in claim 4, a quill coaxially mounted on said intermediate drive shaft and connected with said other of said driving members, means rotatably mounted on said intermediate drive shaft and connected with said drive shaft to be rotated thereby, and third clutch means for engaging said means and said quill to selectively rotate said other of said driving members in a reverse direction from that when rotated by said drive shaft.

6. In an earth auger as defined in claim 5, a speed reducing gear train mounted in said housing and driven from said intermediate drive shaft, and fourth clutch means for interconnecting said train with said quill to drive said other of said driving members at a reduced speed.

7. In an earth auger as defined in claim 6, a first lever interconnected with said first and second clutch means and movable in one direction to engage said first clutch means and disengage said second clutch means and movable in the opposite direction to engage said second clutch means and disengage said first clutch means, and a second lever interconnected with said third and fourth clutch means and movable in one direction to engage said third clutch means and disengage said fourth clutch means and movable in another direction to engage said fourth clutch means and disengage said third clutch means, said levers having a neutral position.

8. In an earth auger as defined in claim 7, an interlock between said levers which limits the movement of said first lever to movement in one operative direction only when said second lever is out of neutral position comprising a spring-biased pin, a socket in said second lever into which said pin longitudinally moves under said bias, and a slot in said first lever into which said pin is forced when not in said socket.

9. In an earth auger having a mast and an auger bar rotatably and axially supported by the mast and a chain for raising and lowering said bar within said mast, means for connecting the ends of said chain to said auger bar comprising a cap connected with the top of said bar and having an aperture therethrough and a lateral projection provided with a hole therethrough, a connector block having a stem projecting downwardly through said aperture, a compression spring reacting between the end of said stem and the underside of said cap, a bolt extending upwardly through said hole and having an adjustable nut on its upper end, a second compression spring on said bolt and reacting between the upper side of said cap and said adjustable nut, the ends of said chain being secured respectively to said connector block and said bolt whereby resilient tension is applied to said chain from both ends.

10. In an earth auger as defined in claim 9, a compression spring seated on the top of said connector block and extending beyond the upper confines thereof and a stop on said mast at the top thereof engageable with said last mentioned spring to cushion the shock created by the auger bar reaching fully raised position.

NICHOLAS M. ERDAHL.

REFERENCES CITED

The following references are of record in the file of this patent:

UNITED STATES PATENTS

| Number | Name | Date |
|---|---|---|
| Re. 18,947 | Greve | Sept. 12, 1933 |
| 1,259,852 | Greve | Mar. 19, 1918 |
| 1,397,324 | Moore | Nov. 15, 1921 |
| 1,887,172 | Smith et al. | Nov. 8, 1932 |
| 1,921,812 | Erdahl | Aug. 8, 1933 |
| 1,966,637 | Menhall | July 17, 1934 |
| 1,997,887 | Prior | Apr. 16, 1935 |
| 2,240,738 | Dunn | May 6, 1941 |
| 2,320,612 | Kandle | June 1, 1943 |
| 2,410,959 | Brown | Nov. 12, 1946 |
| 2,418,601 | Richards | Apr. 8, 1947 |

FOREIGN PATENTS

| Number | Country | Date |
|---|---|---|
| 11,525 | Great Britain | May 17, 1906 |